April 5, 1966  D. R. LACY  3,244,038
SELF-RELEASING LEAD SCREW
Filed Oct. 8, 1963
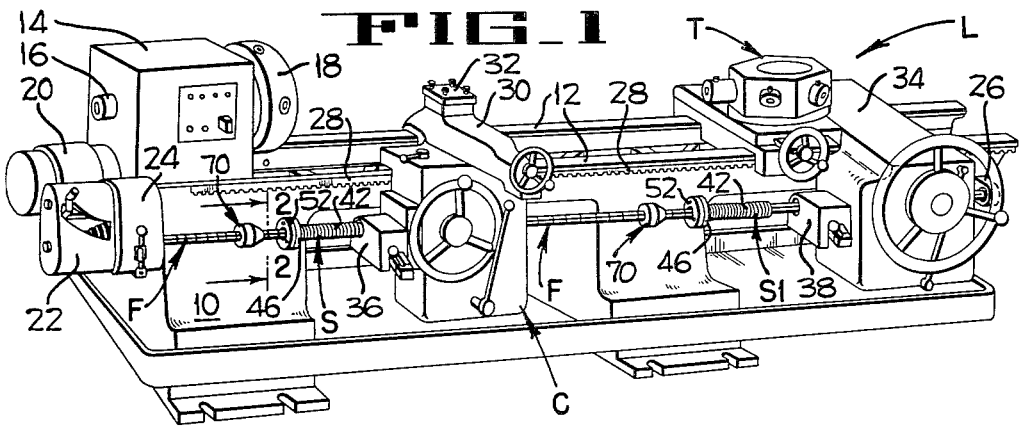
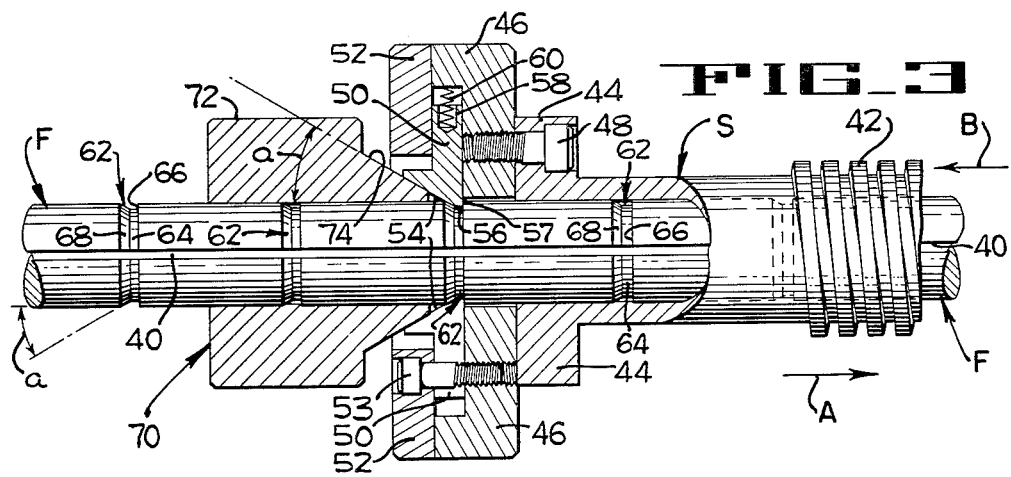
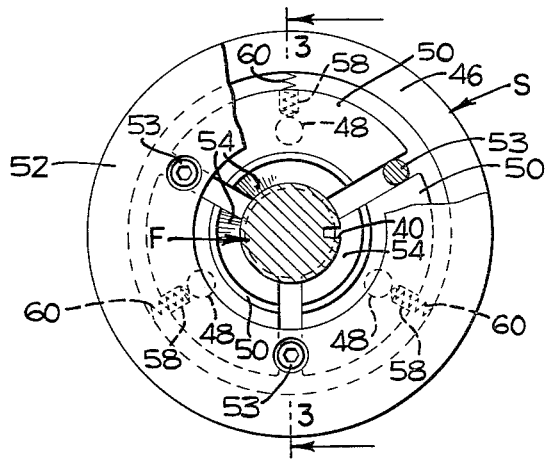
INVENTOR
DONALD R. LACY
BY *Hans G. Hoffmeister*
ATTORNEY United States Patent Office 3,244,038
Patented Apr. 5, 1966

3,244,038
SELF-RELEASING LEAD SCREW
Donald R. Lacy, Brea, Calif., assignor to FMC Corporation, San Jose, Calif., a corporation of Delaware
Filed Oct. 8, 1963, Ser. No. 314,682
6 Claims. (Cl. 82—27)

This invention relates to lathes, and more particularly to lead screw attachments for the feed shaft of lathes, such as turret lathes or the like.

Certain lathes, including a common type of turret lathe, employ a longitudinally extending keyed feed shaft for supplying the power for feeding both the lathe carriage and the lathe turret, or tail stock. Rotation of the feed shaft is translated into linear feed of the carriage and of the turret by internal gearing in these elements, which react against a rack on the lathe bed. It has been proposed to adapt lathes of this type for thread chasing by tools on the carriage, or for the leading on of taps or dies mounted on either the carriage or on the turret.

In the case of turret lathes, one or two of these lead screw attachments may be installed on the lathe feed shaft. One lead screw attachment will cooperate with a manually controlled half nut unit attached to the carriage apron, and there may also be a lead screw attachment for use with a half nut unit on the apron or saddle of the turret, in case the lead screw attachment is to be used for the leading on of taps or dies. Experience has shown that at times lathe operators who have completed their use of a carriage or a turret lead screw attachment will leave the attachment in place on the feed shaft on the lathe. The half nut unit for the associated carriage or turret assembly is then disconnected from the lead screw attachment, and the lathe is shifted to conventional feed. At times the operator forgets that the lead screw attachment has been clamped to the feed shaft, and inadvertently runs the half nut assembly of either the carriage or the turret against the lead screw attachment. This results in jamming and damage to either the half nut assembly, the lead screw attachment, or to both parts.

It is an object of the present invention to prevent damage to a lead screw attachment and to the associated half nut unit in case an operator inadvertently causes either a lathe carriage or a lathe turret saddle to jam against the lead screw attachment, as might occur when the machine tool is in conventional feed.

Another object of the present invention is to provide a lead screw attachment that is automatically self releasing.

Still another object of the invention is to provide a lead screw attachment suitable for leading on either the carriage or the turret saddle of a lathe, which attachment can be positioned at selected points along the lathe feed shaft.

A further object of the invention is to provide a lead screw attachment that can be manually released, for quick adjustment along the lathe feed shaft.

Still another object of the invention is to provide a self releasing lead screw attachment which requires a minimum modification of the lathe feed shaft to which the attachment is fitted.

The manner in which these objects may be attained may be apparent to those skilled in the art from the following detailed description of the invention.

In the drawings:

FIGURE 1 is a perspective showing the major elements of a turret type turret lathe fitted with two lead screw assemblies of the present invention.

FIGURE 2 is a section through a feed shaft of the lathe taken at lines 2—2 of FIGURE 1, showing the lead screw attachment.

FIGURE 3 is a section taken on lines 3—3 of FIGURE 2, but with the lead screw releasing cam in position ready for releasing the lead screw attachment.

FIGURE 1 shows the principal elements of a turret lathe L, upon which is mounted a pair of lead screw assemblies S and S1, embodying the present invention. Although the details of the lathe form no part of the present invention, the principal lathe elements will be briefly described. The lathe illustrated is a turret lathe of a type manufactured by the Warner and Swasey & Company of Cleveland, Ohio. The lathe L has a bed 10, a pair of ways 12, and a head stock 14 which turns the spindle 16. A chuck 18 or other work holder is mounted on the spindle. The lathe is driven by a drive motor 20, and a feed screw F is driven through a selective quick, change gear box 22 and a head end gear box 24.

The other end of the feed screw F is mounted in an outboard bearing 26 fixed to the bed of the lathe. Sliding along the ways 12 of the lathe is the usual carriage C, which contains gearing driven by the feed shaft F, and cooperating with a longitudinal rack 28 for advancing or feeding the carriage. The carriage C includes the usual cross slide 30 that mounts a tool post 32. No tools are shown on the tool post.

The tail stock of the lathe is in the form of a turret T, mounted on a saddle 34, and driven from the feed screw F in the same manner in which the carriage C is driven.

Mounted on the feed screw F are the lead screw assemblies S and S1, each of which embodies the present invention. These lead screw assemblies are identical, and the lead screw assembly S advances the carriage C, whereas the lead screw assembly S1 advances the turret T. A half nut and control assembly 36 is mounted on the apron of the carriage C, and a similar half nut and control assembly 38 is mounted on the apron of the saddle for the turret T. These half nut attachments 36 and 38 are of conventional design, and are intended for gripping lead screw attachments mounted on the feed shaft. Details of the half nut assemblies 36, 38 do not form part of the invention and are not illustrated.

Details of a lead screw assembly S of the present invention appear in FIGURES 2 and 3. The feed shaft F is formed with a longitudinally extending keyway 40, which slides in a feed pinion within the carriage C, and the turret T. The lead screw attachment S includes a lead screw proper 42, which terminates in a mounting flange 44 at its head end, which flange is bolted to a collar 46, by means of cap screws 48. In order to hold the lead screw in adjusted position on the feed shaft F, the lead screw attachment includes three lead screw locating pawls or dogs 50, which are retained in collar 46 by a pawl retaining plate 52 and cap screws 53. Each pawl 50 has a conically shaped face 54 that terminates in a locating nose 56. The nose 56 is also bounded by a radial wall 57. The pawls 50 are formed with spring sockets 58, which receive springs 60 that urge the pawls radially inwardly for engagement with the feed shaft F.

In order to receive the pawls 50, the feed shaft F is specially prepared by turning a series of axially spaced grooves 62 therein. Each groove has a bottom wall 64, a radial abutment shoulder 66 and a beveled wall 68. The beveled wall 68 forms an angle "a" with the axis of the feed shaft F of approximately 30°, which angle also equals the corresponding angle of inclination of the conical wall 54 of the pawls 50. It will be noted that the beveled wall 68 faces the tail end of the lead screw. In a typical lathe, the grooves 62 will be spaced about 2 inches along the length of the feed shaft F, and the bottom wall 64 of each groove will be approximately ⅛" wide.

In order to provide for manual release of the lead screw attachment for positioning its pawls 50 in a selected groove 62 on the feed shaft F, a lead screw release cam or disengager 70 is slidably mounted on the feed shaft. The release cam 70 includes a grip flange 72, and a conical pawl releasing nose 74, which has an angle of inclination "a" of 30° corresponding to the other angles previously described. One or both lead screw assemblies and their release cams 70 are slipped over the feed shaft F, before it is reinstalled in the lathe.

In operation, and referring to FIGURE 1, the lead screw assembly S is shown engaged by the half nut assemly 36 of the carriage C, so that the carriage C is now ready for chasing threads, or for leading on a tap or die mounted on the tool holder. During the cutting operation, the force exerted on the lead screw 42 is contrary to the direction of lead, that is, to the right, or in the direction of the arrow A, of FIGURE 3. This force is taken by the radial abutment wall 66 of the groove 62, and the radial walls 57 of pawls 50.

The lead screw assembly S1, FIGURE 1, is not in operation at this time but is in position to be damaged by the turret T; if the lead screw 42 were clamped on in the conventional manner. It can be seen from FIGURE 1 that should the operator engage the conventional feed for the turret T, to cause the feed shaft F to advance the turret toward the lead screw S1, and should the operator overlook the fact that the lead screw S1 is in the path of the half nut control unit 38, the half nut control unit can be jammed against the tail end of the lead screw, with damage to both parts. However, the lead screw attachments S and S1 of the present invention prevent the occurrence of such damage.

When the half nut control unit (such as unit 38) strikes the end of a lead screw 42 of the present invention, it urges the lead screw assembly in the direction of the arrow B of FIGURE 1. This application of force to the tail end of the lead screw causes the beveled face 68 of the groove 62 in the feed shaft to cam the pawls 50 radially outwardly of the groove 62, by means of the conical faces 54 of each pawl, and against the force of the springs 60. Thus the lead screw assembly merely slides along the feed shaft F, without damage to the half nut, or to the lead screw itself.

This self releasing action will take place even if the lead screw release cam, or disengager 70, is left in the position shown in FIGURE 3, or if the lead screw is brought against the release cam 70 during the aforesaid self releasing action. The conical nose 74 of the release cam 70 merely acts as additional camming means for disengaging the pawls from the grooves 62.

If the operator desires to reposition the lead screw assembly S or S1 along the feed shaft F, he need only bring the release cam or disengager 70 into the position shown in FIGURE 3. He can then grasp the grip flange 72 of the release cam and the collar 46 of the lead screw assembly with one hand, and bring these parts together. This action cams the pawls 50 clear of the groove 62 into which they have been resting, and the pawls can be held clear of the feed shaft F in this manner until the lead screw is repositioned at the desired location along the feed shaft F.

Thus it can be seen that once the feed shaft F is formed with the combined locating and release grooves 62 as described, and fitted with one or more of the lead screw assemblies S, S1 of the present invention, an automatic, self releasing, jam preventing installation is provided, which protects both the lead screw and the associated half nut unit on either the carriage or the turret of the lathe.

Having completed a detailed description of the invention so that those skilled in the art may practice the same, I claim:

1. In combination, a lathe having ways, a tool carrier slidable along said ways, means for feeding said tool carrier along the ways comprising a longitudinally extending feed shaft extending through said carrier, and nut means on said carrier for threaded engagement with the body of a lead screw mounted on said feed shaft; a plurality of axially spaced detent cavity means formed in said feed shaft, a self releasing lead screw assembly, said assembly comprising a lead screw slidably mounted on said feed shaft and driven by the shaft, and pawl means on the head end of said lead screw for engaging said feed shaft detent cavity means and restraining the lead screw against axial sliding motion along the shaft in a direction contrary to the direction of feed of the screw, said pawl means automatically accommodating sliding motion of the lead screw along the shaft in the direction of feed of the screw in response to force applied to the screw in said latter direction.

2. In combination, a lathe having ways, a tool carrier slidable along said ways, means for feeding said tool carrier along the ways comprising a longitudinally extending feed shaft extending through said carrier, and nut means on said carrier for threaded engagement with the body of a lead screw mounted on said feed shaft; a plurality of axially spaced, circumferential grooves formed in said feed shaft, a self releasing lead screw assembly, said assembly comprising a lead screw slidably mounted on said feed shaft and driven by the shaft, pawl means on the head end of said lead screw for engaging said feed shaft grooves and restraining the lead screw against axial sliding motion along the shaft in a direction contrary to the direction of feed of the screw, and means for automatically withdrawing said pawl means from said grooves in the feed shaft, and accommodating sliding motion of the lead screw along the shaft in the direction of feed of the screw in response to force applied to the screw in said latter direction.

3. The combination of claim 2, including a pawl means releasing cam freely slidable on said feed shaft at the head end of said lead screw assembly, said cam having a pawl means engaging portion for releasing said pawls from said feed shaft grooves in response to an axial force that brings said cam and pawl means together.

4. In combination, a lathe having ways, a tool carrier slidable along said ways, means for feeding said tool carrier along the ways comprising a longitudinally extending feed shaft extending through said carrier, and nut means on said carrier for threaded engagement with the body of a lead screw mounted on said feed shaft; a plurality of axially spaced, circumferential grooves formed in said feed shaft, said grooves each having a beveled wall that forms an obtuse angle with the axis of the screw and faces in a direction contrary to the direction of feed of the screw, said grooves each having a substantial radial abutment wall opposed to its beveled wall; a self releasing lead screw assembly, said assembly comprising a lead screw slidably mounted on said feed shaft and driven by the shaft, a plurality of radially movable pawls mounted on the head end of said lead screw, each pawl having a beveled wall for engaging the beveled walls of said grooves and a substantial radial wall for engaging the abutment walls of said grooves, and spring means for urging said pawls into said grooves, said pawls automatically accommodating sliding motion of the lead screw along the shaft in the direction of feed of the screw, in response to force applied to the screw, in said latter direction.

5. A self releasing lead screw assembly for slidable, rotationally driven mounting on a longitudinal feed shaft of a lathe which shaft is formed with an axial keyway and a plurality of axially spaced circumferential grooves; said lead screw assembly comprising a sleeve having a head and a unitary threaded body for threaded engagement with nut means on a lathe tool carrier, a plurality of pawls radially slidable in said screw head, each pawl having a radially inner beveled wall that faces away from the screw body and forms an acute angle with the screw axis, each pawl also having an opposed, substantially radial abutment wall; spring means in said head for urging said pawls radially inward against the lathe feed shaft; and a manually operable pawl release member comprising a sleeve for slidable mounting on the lathe feed shaft, said sleeve having means for engaging and retracting said pawls from the circumferential grooves in the lathe feed shaft.

6. The lead screw assembly of claim 5, wherein the pawl engaging means of said pawl release member comprises a generally conical end wall complementary to the beveled walls of said pawls.

References Cited by the Examiner
UNITED STATES PATENTS

| | | | |
|---|---|---|---|
| 457,974 | 8/1891 | Sampson | 82—27 X |
| 590,736 | 9/1897 | Earle | 82—27 X |
| 2,933,001 | 4/1960 | Stege | 82—27 X |
| 3,023,631 | 3/1962 | Curtis | 82—27 X |

WILLIAM W. DYER, Jr., *Primary Examiner.*

L. V. LACHOS, *Assistant Examiner.*